3,379,761
1 - ISOPROPYL AMINE - 2 - HYDROXY - 3-
(o - PROPARGYLOXY - PHENOXY) - PRO-
PANE AND SALTS THEREOF
Max Wilhelm, Allschwil, Switzerland, assignor to
Ciba Corporation, New York, N.Y., a corpora-
tion of Delaware
No Drawing. Filed Nov. 1, 1965, Ser. No. 505,960
Claims priority, application Switzerland, Dec. 17, 1964,
16,313/64
2 Claims. (Cl. 260—570.7)

ABSTRACT OF THE DISCLOSURE 1-isopropylamino-2-hydroxy-3 - (ortho-propargyloxy-phenoxy)-propane and its acid addition salts. The compound and its therapeutically useful acid addition salts possess an inhibiting effect upon adrenergic β-receptors and can be used in the treatment of cardiac and/or circulatory diseases.

---

The present invention relates to a new secondary amine and its salts. Especially it concerns the 1-isopropylamino-2-hydroxy-3-(ortho-propargyloxy-phenoxy) - propane of the formula

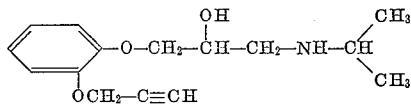

The new compound possesses valuable pharmacological properties, especially an inhibiting effect upon adrenergic β-receptors. For example, in the cat narcotized with 5,5-diallylbarbituric acid or in the unnarcotized dog the compound inhibits the lowering of the blood pressure produced by isoproterenol when administered in doses of 0.01–1 mg./kg. i.v. or 2–3 mg./kg. p.o. It is capable of suppressing digitalis-induced extra-systoles as shown, for example, in experiments with a dosis of 0.3–1 mg./kg. i.v. in the narcotized dog. The compound can therefore be used as a medicament for the treatment of cardiac and circulatory diseases.

The new compound is prepared by known methods. Advantageously, a 1-halogeno-2-hydroxy-3-(ortho-propargyloxy-phenoxy)-propane or 3-(ortho-proparglyoxy-phenoxy)-1,2-epoxypropane is reacted with isopropylamine.

Halogen atoms are primarily chlorine, bromine or iodine atoms. The reaction is performed in the usual manner, advantageously in the presence of a basic condensing agent or of an excess of amine.

The starting materials are known or can be prepared by known methods.

Depending on the reaction conditions and starting materials used the final product is obtained in the free form or in the form of its salts which are likewise included in the present invention. The salts of the final product can be converted into the free base in known manner, for example with alkalies or ion exchange resins. When the base is reacted with organic or inoragnic acids, especially those which are suitable for forming therapeutically useful salts, it yields salts. As such acids there may be mentioned for example:

Hydrohalic, sulfuric, phosphoric acids, nitric, perchloric acid; aliphatic, alicyclic, aromatic or heterocyclic carboxylic or sulfonic acids such as formic, acetic, propionic, succinic, glycollic, lactic, malic, tartaric, citric, ascorbic, maleic, hydroxymaleic or pyruvic acid; phenylacetic, benzoic, para-aminobenzoic, anthranilic, para-hydroxybenzoic, salicylic or para-aminosalicylic acid, embonic, methanesulfonic, ethanesulfonic, hydroxyethanesulfonic, ethylene-sulfonic acid; halobenzenesulfonic, toluenesulfonic, naphthalenesulfonic acid or sulfanilic acid; methionine, tryptophan, lysine or arginine.

These and other salts of the new compound, for example the picrate, may also be used for purifying the resulting free base, by converting the free base into a salt, separating it and liberating the base from the salt. In view of the close relationship of the new compound in the free form and in the form of its salts what has been said above and below with regard to the free base relates similarly and where suitable also to the corresponding salts.

The invention includes also any variant of the present process in which an intermediate obtained at any stage of the process is used as a starting material and any remaining step/steps is/are carried out or the process is discontinued at any stage thereof, or in which the starting materials are formed under the reaction conditions or may be used in the form of their salts.

The new compound may be in the form of the racemate or in the form of antipodes. The racemate can be resolved into its antipodes in the known manner.

The new compound may be used, for example, in the form of pharmaceutical preparations which contain it in the free form or in the form of its salts in conjunction or admixture with an organic or inorganic, solid or liquid pharmaceutical excipient suitable for enteral or parenteral administration. Suitable excipients are substances that do not react with the new compound, for example, water, gelatin, lactose, starches, stearyl alcohol, magnesium stearate, talcum, vegetable oils, benzyl alcohols, gums, propyleneglycols, white petroleum jelly, or other known medicinal excipients. The pharmaceutical preparations may be, for example, tablets, dragees or capsules, or in liquid form solutions, suspensions or emulsions. They may be sterilized and/or contain auxiliaries such as preserving, stabilizing, wetting or emulsifying agents, solution promoters or salts for regulating the osmotic pressure or buffers. They may also contain further therapeutically valuable substances. The pharmaceutical preparations are formulated by known methods.

The following examples illustrate the invention.

Example 1

A solution of 15 g. of 3-(ortho-propargyloxy-phenoxy)-1,2-epoxy-propane and 15 g. of isopropylamine in 20 ml. of ethanol are refluxed for 4 hours. The batch is then evaporated under vacuum, and the residue dissolved in 2 N-hydrochloric acid. The acid solution is extracted with ether. The aqueous phase is rendered alkaline by the addition of 10 N-sodium hydroxide solution, then extracted with ether. The ethereal extract is separated, dried and evaporated. 1 - isopropylamino-2-hydroxy-3-(ortho-propargyloxy-phenoxy)-propane of the formula

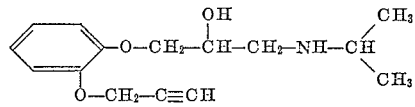

remains behind in the form of a slowly crystallizing oil. Melting point, 48–52° C.

The hydrochloride of the compound melts at 96–97° C.

The 3 - (ortho-propargyloxy-phenoxy)-1,2-epoxy-propane used as starting material is prepared as follows:

110 g. of pyrocatechol are dissolved in 1 liter of acetone and the solution, while being stirred well, heated at 80° C. for 4 hours with 150 g. of potassium carbonate and 120 g. of propargyl bromide. Undissolved matter is then distilled off, and the solvent evaporated under reduced pressure. The residue is distilled under a water-jet vacuum. There is obtained the pyrocatechol mono-propargyl ether which boils at 120–130° C. under a 14 mm. Hg pressure.

30 g. of pyrocatechol-mono-propargyl ether are boiled and stirred for 12 hours with 30 g. of epichlorohydrin and 30 g. of potassium carbonate in 200 ml. of acetone. Undissolved matter is filtered off and the batch evaporated under reduced pressure. The residue is dissolved in ether and the solution extracted with 2 N-sodium hydroxide solution. The ethereal solution is dried and evaporated. An oil remains behind which is distilled under a water-jet vacuum. 3-(ortho-propargyloxy-phenoxy)-1,2-epoxy-propane is obtained which boils at 161–170° C. under a pressure of 11 mm. of Hg.

Example 2

Tablets containing 20 mg. of active substance can be prepared from the following ingredients:

|  | Mg. |
|---|---|
| 1-isopropylamino-2-hydroxy-3-(ortho propargyloxy-phenoxy)-propane | 20 |
| Starch | 60 |
| Lactose | 50 |
| Colloidal silicic acid | 5 |
| Talcum | 9 |
| Magnesium stearate | 1 |
|  | 145 |

Example 3

In the manufacture of capsules the following mixture is used:

|  | G. |
|---|---|
| 1-isopropylamino - 2 - hydroxy-3-(ortho-propargyl-oxy-phenoxy)propane | 2500 |
| Talcum | 80 |
| Colloidal silicic acid | 20 |

The active substance is intimately mixed with talcum and colloidal silicic acid, the mixture passed through a sieve (0.5 mm.) and 21 mg. portions of it filled into hard gelatine capsules.

Example 4

The new compounds can be used in the form of pharmaceutical preparations containing them in admixture or conjunction with compounds having a vasodilating, especially coronary dilating effect, primarily vasodilating esters of nitrous acid or of nitric acid, above all, nitroglycerine, pentaerythritol tetranitrate, triethanolamine trinitrate, nitromannitol, also theobromine, theophyllin, hydroxyethyltheaphylline, dihydrovypropyl - theophyiline, and other coronary dilating derivatives of theobromine or theophyllin, as well as 2-ethyl-3-(3′,5′-diiodo-4′-hydroxy-benzoyl)-benzofuran, 2,6-bis-(diethanolamino)-4,8-dipiperidinopyrimido[5,4-d] - pyrimidine, and N-3′-phenyl-propyl-(2′)-1,1-diphenyl-propyl-(3)-amine or adenosine.

The tablets are so formulated that the daily dose is 5–50 mg. of 1-isopropylamino-2-hydroxy-3-(ortho-propargyloxy-phenoxy)-propane and 5–50 mg. of pentaerythritol tetranitrate, advantageously with three daily administrations.

What is claimed is:

1. A member selected from the group consisting of 1-isopropyl-amino-2-hydroxy - 3 - (ortho-propargyloxy-phenoxy)-propane of the formula

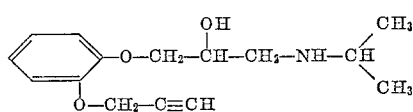

and an acid addition salt thereof.

2. 1 - isopropyl - amino - 2 - hydroxy - 3 - (ortho - propargyloxy-phenoxy)-propane of the formula

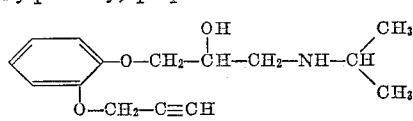

References Cited

UNITED STATES PATENTS 3,328,424   6/1967   Schenker et al. ___ 260—326.14

CHARLES B. PARKER, *Primary Examiner.*

ROBERT V. HINES, *Examiner.*